Dec. 1, 1964   R. S. DUNCAN ETAL   3,159,144
INSECTICIDE APPLICATOR STRUCTURE
Filed April 2, 1963
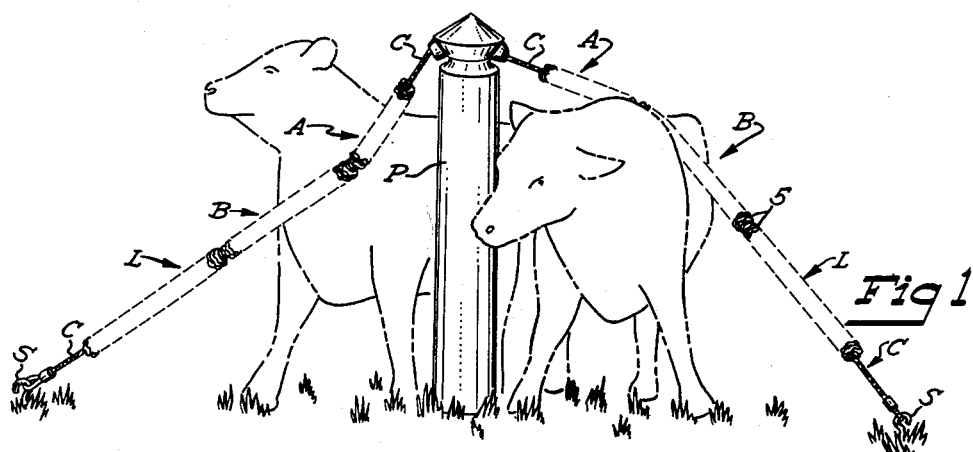
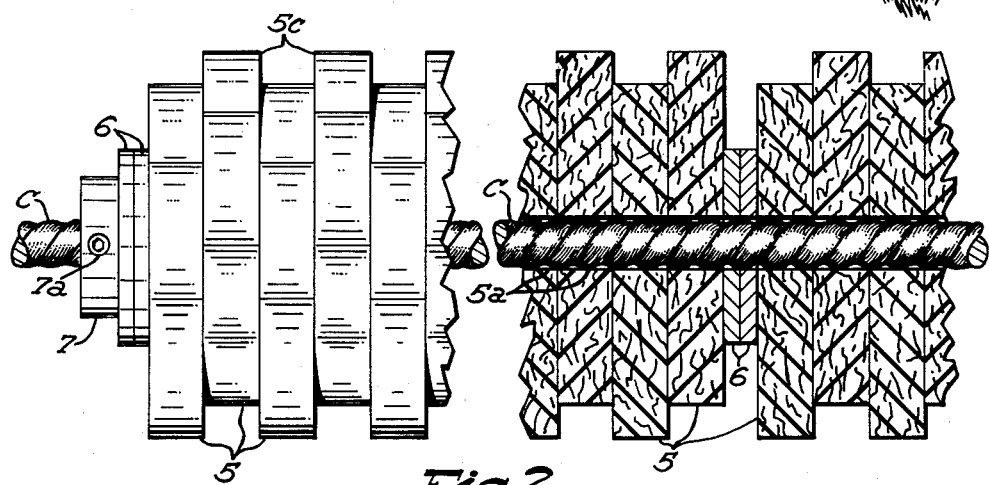
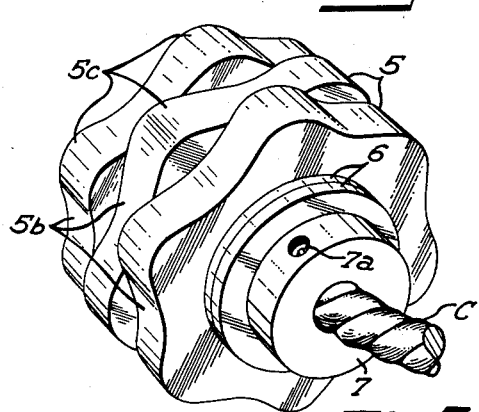
INVENTORS
RONALD S. DUNCAN,
BY BENJAMIN W. ARNOLD
Williamson & Palmatier
ATTORNEYS United States Patent Office 3,159,144
Patented Dec. 1, 1964

3,159,144
INSECTICIDE APPLICATOR STRUCTURE
Ronald S. Duncan, 323 W. Sorenson, and Benjamin W. Arnold, 149 E. Schlieman, both of Appleton, Minn.
Filed Apr. 2, 1963, Ser. No. 270,050
4 Claims. (Cl. 119—157)

This invention relates to structure and apparatus for applying liquid insecticides, lotions and medicated chemicals to the hair and skin of domestic animals such as cattle, pigs, horses and the like.

It has been found that by application of insecticides and liquid medicants to the backs, shoulders and rumps of such animals, quite general distribution of the liquids is obtained to the other portions of the animals' bodies, eliminating parasites such as the various flies, ticks, lice and mange mites, and improving the condition of the animal's hair and skin.

Several prior art devices have employed rubbing cables or suspended applicators saturated with the treatment liquids or oils, whereby the animal will rub or scratch itself on the cable or other applicator, thereby distributing the liquid over its hair and skin. The main problems with such apparatus have been, first, the uniform supply of the treatment liquid throughout the length of the rubbing cable or other applicator and, secondly, the prevention of waste of the relatively expensive treatment ingredients.

Most prior art devices employing so-called rubbing cables have been comparatively expensive, requiring a multiplicity of liquid hold-back and redirecting parts and have employed such elements and materials as to often repel animals from the use thereof because of discomforts in use, particularly in both hot and cold temperatures.

Devices of the prior art have successfully solved the problem of continuously feeding or supplying the desired liquids from a source to the upper end of a continuous anchored cable which acts externally as a trickle-conveyor for causing liquid by gravity to move downwardly through the applicator elements.

Our present invention relates specifically to the applicator structure per se, including an anchored liquid-conveying cable inclined with reference to the ground.

It is a main object of our present invention to provide applicator structure of the class described which may be manufactured and sold at low cost, which will simplify the working parts thereof while providing a highly efficient distribution of the liquid material throughout the effective "rub" portion of the cable while eliminating waste.

A further object is the provision of a highly efficient, simplified liquid applicator wherein the applicator and distributing elements may be obtained from inexpensive materials, but nevertheless because of formation and inability to transmit heat or cold, will induce the animal to rub and scratch thereagainst.

More specifically, it is an object to provide a multiplicity of non-heat-conductive, rotatable elements peripherally roughened, which through inherent structure and material, produce a uniform and highly efficient dispersing of insecticide oils or the like, which flow downwardly on a cable or the like from a suitable supply source.

Preferably our applicator structure, in addition to the rubbing cable loosely anchored in an inclined relation to the ground, comprises a plurality of rotatable sections, each composed of a multiplicity of inexpensive disc-like members strung upon the cable in end-to-end relation. The disc members, or at least most thereof, are composed of non-abrasive, somewhat compressible material such as rubber reinforced by cords or fibers and having irregular peripheral edges preferably in the form of scallops to invite rubbing or scratching by the animal, while retaining little heat or cold which would repel the animal from using the same.

An excellent and very inexpensive source of such disc members is available from used pneumatic tire casings where the treads and side walls may be readily cut by dies into scalloped, disc shape and at the same time centrally apertured for sectional stringing upon a flexible supporting member such as a cable chain or the like.

Such reinforced or cord rubber material as will be later more fully set forth, provides an adequate porosity for impregnation of the treating liquid or oil as well as because of flexing and shifting movements in the rubbing action of animals, furnishes a very efficient uniform distribution throughout the applicator section without wasting the rather expensive medicated or chemical lotion.

Referring to the accompanying drawings wherein like reference characters refer to similar parts throughout the several views:

FIG. 1 is a perspective view showing an embodiment of our invention loosely anchored at top and bottom and inclined at an angle to the ground for use, the upper end of the supporting cables being communicated with a conventional source of substantially continuous supply of the treating liquid and illustrating by dotted lines the contours of two steers utilizing the apparatus;

FIG. 2 is a longitudinal cross section in part and in part in full, showing portions of two adjacent rotary sections of our applicator structure operatively mounted on a supply and supporting cable; and FIG. 3 is a perspective view on a somewhat larger scale showing a few of the rubbing elements or discs mounted operatively upon a spirally wound cable with a pair of our cooperating bearing washers disposed at the lower end thereof.

Referring now in detail to the embodiment illustrated herein our applicator structure is supported at one end in any suitable manner from an upstanding member such as a post P which may have embodied therein in conventional manner a tank and pump supply of the liquid to be applied to the animals. Such liquid is often in the form of an oil or lotion containing chemical or medical ingredients for destroying pest insects and/or for soothing and healing mange, sores and the like. A relatively non-stretchable cable of conventional type C spirally wound or braided forms the core of our structure and is attached at its upper end to the post P extending into the supply of liquid therein and is constantly supplied with such liquid which will dribble down the cable through action of gravity. The cable is rather loosely anchored at its opposite end to any firm anchoring medium such as the stake S having an upstanding loop thereon wherein the lower end of the cable is made fast. The cable is preferably inclined relatively to the ground and is sufficiently slack so that animals may rub their shoulders, flanks and back, distorting the cable to a curved formation in such process.

We provide in close combinative relation with the cable a multiplicity of relatively thin disc-like rubbing elements 5 being centrally apertured at 5a to rather snugly fit the contour of the cable while being rotatable thereon. The peripheries of these elements are irregular with reference to circular and preferably have scalloped peripheral edges 5b which leave rounded lug portions 5c, which produce in unison a pleasant and enticing rubbing action to domestic animals such as cattle, pigs, horses and the like.

The disc-like rubbing elements are constructed of a non-heat conductive, non-abrasive, somewhat pliable and compressible material such as a rubber composition reinforced by fibers or cords 5d, whereby limited flexure of the individual disc 5 in many directions is present. The upper and lower faces of the rubbing elements purposely are in somewhat roughened state to provide limited friction in abutment with adjacent elements of similar construction. The inherent nature of the material used will provide a deviation from smoothness of the desired type to afford such minor friction which is also a factor in distribution and return of the liquid ingredient relative to the supply cable.

As has been previously recited, a very efficient and non-expensive source of such disc rubbing elements is available from used and damaged pneumatic tire casings where the worn tread portions and side walls may be readily cut by dies into the scalloped or irregular disc shape and at the same time the discs may be centrally apertured for stringing upon the flexible supporting and supply member such as a cable, chain or the like C.

In our preferred construction several sections of said rubbing discs 5 are snugly strung upon the cable or other flexible supporting element without interposition of any additional elements or bearing surfaces therebetween. For example, in FIG. 1 an upper section A comprising a multiplicity of discs and approximating say 12 to 14 inches in length is strung upon the cable in abutting relation. Below this group or section of disc-rubbing elements a pair of thin metallic bearing washers 6 of substantially less diameter than that of the discs are interposed and thereafter, below said bearing washers an intermediate or second section B comprising a multiplicity of identical rubbing discs strung upon the cable and abutted in relation are provided. The intermediate section is usually longer than the top section approximating 16 to 24 inches in length. Below said intermediate section a pair of thin, metallic bearing washers 6 are strung upon cable C against which the discs of section B abut and to facilitate usually bodily revolving of all of the discs of section B when a part thereof is engaged by the contour of an animal with scratching or rubbing action.

As shown, a lower section L of identical rubbing discs comprising a multiplicity thereof is strung in abutment having below the lowermost thereof, one or more bearing washers 6 similar to the previously described washers which are in abutment and supported by an enlargement of the cable or other abutment medium at the lower and attached end of the cable, such as the fixed collar 7 having a set screw 7a for tightening against the lower portion of the cable.

In FIG. 1 the contour of a steer rubbing its shoulders and back against the central portion of the applicator structure is indicated. It will be noted that in said rubbing action the steer distends the engaged portion of the overall applicator structure into a curved formation due to the contour of the portion of the body engaged. Any rubbing action, lateral or longitudinal movements of the steer's body produces a revolution of the respective discs in the two or more sections of the apparatus which are engaged. The distending of the sections of the body causes a flexing and weaving action of the somewhat pliable discs and an actual squeezing of liquid supplied between the individual discs in the direction of the fur, hair and hide of the animal. Such weaving and flexing actions inherently also during revolution of the discs, produces inclination of the discs to return accumulated liquid towards the cables and also cause binding of the discs upon the surrounded portions of the cable. Such variable action prevents free flow of the intercepted liquid from the cable by the disc downwardly while nevertheless obtaining during brisk rubbing some actual pumping action between adjacent discs to abundantly supply the rubbed parts of the animal with the desired liquid.

The scalloped edges of the discs in the various staggered and other relations assumed at random by the various rubbing actions, entice animals after first experience therewith because of the comforting scratching without abrasion or sharpened edges as are utilized in metal rubbing and redirecting elements. Furthermore, since the discs are made of non-heat-conductive material, the temperature of the exteriors thereof will be substantially that of the surrounding atmospheric temperature. There will be no tendency in cold weather to repel the animals because of chilling or in hot sunny weather, to repel the animals because of high temperatures.

In the operation of our device, the sections A, B and L of the discs revolve for the most part as units through the frictional abutment of the respective disc-rubbing elements upon one another, but it will be understood with various rubbing actions individual discs are sometimes relatively revolved or oscillated. The discs in time become pretty well impregnated, due to their porosity, with the oil or liquid.

The effect of the great multiplicity of discs snugly surrounding the cable is to provide a damming action preventing continuous downward flow and leakage of the oil or liquid when the apparatus is not in use. When used actual small pumping actions are obtained between the abutted discs by the previously described individual flexing of discs with slight displacements of the contact between the apertured portion of the affected discs and the supply cable. These actions and weaving of the discs through distorting the normal contour of the overall applicator during rubbing of the animal, displace the abutted discs at times slight distances apart and the discs maintain slight inclined relations in a gyratory manner during revolutions of the sections A, B and L. After the rubbing action is discontinued through the force of gravity the discs again resume their abutted relation in each section.

The relatively small and smooth bearing washers 6 interposed between the several sections A, B and L facilitate bodily turning of the individual sections.

Actual usage of our apparatus in comparative tests with applicator apparatus of the prior art has shown us that distribution of the liquid or oil is more uniform, wastage of oil less at the lower end of the cable, and our structure induces animals to use and obtain its benefits to a greater extent than in such competitive devices.

It will of course be understood that various changes may be made in the form, details, arrangement and proportions of the parts without departing from the scope of our invention.

What is claimed is:

1. Applicator structure for applying liquid such as an insecticide to domestic animals through the medium of such animals rubbing their bodies thereagainst, having in combination,
    an elongated, substantially flexible elongated supporting element anchored at the ends thereof and disposed in at least a somewhat inclined relation with respect to the ground and effective to cause liquid to trickle downwardly thereon from a source,
    a multiplicity of somewhat flexible and elastic disc elements having irregular peripheral edges and centrally apertured and axially and snugly disposed upon said supporting element in end to end relation and rotatable upon said element, said disc elements being constructed for the most part of rubber-like material and having limited porosity and slightly roughened face surfaces,
    said disc elements cooperating with said elongated supporting element to disperse liquid from said supporting element outwardly and radially and to shift planar positions relative to each other and to said supporting element when rubbed against by the rounded contour of the body of a domestic animal, and serving to stop or dam the downward flow of liquid on said supporting element upon cessation of said rubbing action.

2. Applicator structure for applying liquid such as an insecticide to the hair and skin of domestic animals through the medium of such animals rubbing their bodies thereagainst, having in combination,
    an elongated, substantially non-stretchable and flexible supporting element such as a cable adapted to convey liquid downwardly thereof from a source, means for loosely anchoring said element in an inclined relation with respect to the ground, a multiplicity of elastic disc-like liquid-distributing elements centrally apertured and strung upon said supporting element in substantially end to end relation, most of said elements being constructed of non-heat-conductive, rubber-like material having reinforcing fibers such as cords therein, and having generally scalloped peripheral edges and rather snugly fitting said supporting element while never-the-less rotatable independently thereon, the faces of said disc-like elements being slightly roughened to provide friction therebetween and having a small degree of porosity for absorption of some of said liquid.

said elements having limited flexibility and some compressibility to enable the same to flex somewhat in planar relation with adjacent elements and with said supporting means when an animal applies a rubbing force against said assembly.

3. Applicator structure for applying liquid such as insecticide to domestic animals by rubbing action of said animal, having in combination, an elongated supporting element of small cross sectional area supported at its ends in at least a somewhat inclined relation with respect to the ground, and adapted to convey liquid downwardly thereof from a source, a series of symmetrical applicator sections snugly surrounding said supporting element and rotatable thereon by rubbing action against the peripheries thereof, each of said sections comprising a series of elastic disconnected discs or laminations being constructed of somewhat compressible and flexible dielectric material having roughened peripheral surfaces and disposed one above the other in normally abutting relation and smooth bearing elements also surrounding said supporting member and interposed respectively between said sections.

4. The structure set forth in preceding claim 3 wherein said discs or laminations are constructed from rubber-like material having limited porosity and having reinforcing fibers imbedded therein.

References Cited in the file of this patent
UNITED STATES PATENTS

| | | |
|---|---|---|
| 2,277,443 | Livingston | Mar. 24, 1942 |
| 2,581,028 | Kirk | Jan. 1, 1952 |
| 2,883,965 | Kirk | Apr. 28, 1959 |
| 2,884,100 | McKee | Apr. 28, 1959 |
| 2,982,251 | Krogman | May 2, 1961 |
| 3,062,187 | Piel | Nov. 6, 1962 |